United States Patent [19]
Zona et al.

[11] Patent Number: 5,195,388
[45] Date of Patent: Mar. 23, 1993

[54] ARTICULATED ROBOT

[75] Inventors: Mauro Zona; Mauro Bettinardi, both of Turin, Italy

[73] Assignee: Comau SpA, Turin, Italy

[21] Appl. No.: 770,432

[22] Filed: Oct. 3, 1991

[30] Foreign Application Priority Data

Oct. 4, 1990 [IT] Italy .................. 67763 A/90

[51] Int. Cl.$^5$ ............... G05G 11/00; H02K 11/00; B65D 33/14; B25J 11/00
[52] U.S. Cl. .......................... 74/479; 310/71; 384/24; 901/23; 901/28; 403/373
[58] Field of Search ........... 74/479; 384/24, 53; 212/142.1, 179; 403/373, 385; 248/282; 901/15, 16, 23, 28, 29; 294/106, 115; 104/93, 119, 118, 120; 105/156, 144, 145; 361/331, 391, 392, 394, 395, 396, 342; 310/71, 67 R

[56] References Cited

U.S. PATENT DOCUMENTS

| Re. 10,299 | 3/1883 | Weston | 248/282 |
| 3,149,611 | 7/1965 | Mahoney | 384/24 |
| 3,259,958 | 7/1966 | Lemelson | 29/26 |
| 4,323,758 | 4/1982 | Vokurka | 901/16 X |
| 4,540,212 | 9/1985 | Inaba et al. | 294/115 X |
| 4,552,504 | 11/1985 | Nakada | 414/735 |
| 4,645,409 | 2/1987 | Gorman | 901/29 X |
| 4,782,244 | 11/1988 | Wakimoto | 310/71 X |
| 4,787,813 | 11/1988 | Stevens et al. | 901/23 X |
| 4,955,250 | 9/1990 | Fisher | 901/23 X |
| 4,972,731 | 11/1990 | Akutagawa et al. | 74/479 |

FOREIGN PATENT DOCUMENTS

| 0044548 | 11/1982 | European Pat. Off. . |
| 0121843 | 10/1984 | European Pat. Off. . |
| 0233712 | 8/1987 | European Pat. Off. . |
| 2230450 | 12/1974 | France . |
| 1268404 | 11/1986 | U.S.S.R. | 294/106 |
| 1414748 | 8/1988 | U.S.S.R. | 294/106 |

OTHER PUBLICATIONS

European Search Report 87300653 Oct. 1987.

Primary Examiner—Allan D. Herrmann
Assistant Examiner—David W. Laub
Attorney, Agent, or Firm—Sughrue, Mion, Zinn, Macpeak & Seas

[57] ABSTRACT

The casing of an arm of an articulated robot has a shell-like structure which serves a load-bearing function and houses a module containing the motor unit and related transmission.

9 Claims, 6 Drawing Sheets

ARTICULATED ROBOT

BACKGROUND OF THE INVENTION

The present invention relates to an articulated industrial robot, that is, an industrial robot which has at least one articulated arm, the distal end of which has an articulated wrist with a plurality of degrees of freedom. Articulated robots are differentiated from so-called "cartesian" robots which have slides mounted for sliding relative to each other along mutually perpendicular straight lines.

More particularly, the present invention relates to an articulated robot of the known type which includes at least one first body and one second body supported by the first body for rotation about an axis, the first body including a load-bearing structure on which a motor unit for rotating the second body is mounted and a rigid outer casing.

In a conventional articulated robot structure, the first body and the second body may be constituted, for example, by a first movable robot arm and a second arm which in turn is rotatable on an end of the first arm. Still according to the prior art, each arm essentially comprises the following components: a load-bearing structure, typically constituted by a steel frame, for example, in the form of a beam with an H-section, a motor unit for driving the movable part carried by the arm, the motor unit including at least one electric motor and one mechanical transmission whose support structures are fixed, usually by bolts, to the load-bearing frame, and a rigid outer casing which surrounds the structure constituted by the load-bearing frame and the motor unit mounted thereon.

SUMMARY OF THE INVENTION

The object of the present invention is to provide an articulated robot of a new design having a structure which is stronger and/or less bulky than conventional structures and which enables the manufacture of the robot to be rationalised and made easier and more flexible, whilst its maintenance by the user and, in particular, the replacement of any damaged components, is particularly quick and easy.

In order to achieve this object, the subject of the present invention is an industrial robot of the type referred to at the beginning of the present description, characterised in that the rigid outer casing is constituted by a shell-like structure which also performs the function of a load-bearing structure and has a cavity for housing the motor unit, the motor unit forming part of a module which can be separated from the shell-like structure and is fixed releasably thereto.

In the robot according to the invention, each of the various parts of the robot has two essential basic components: an outer shell which performs the functions of both a protective casing and a load-bearing structure, and a separable internal module including the motor unit and any mechanical transmission associated therewith.

For example, in the case of a robot arm, on the one hand, the use of a shell-like structure enables an arm with given flexural and torsional strength to be less bulky or, alternatively, enables an arm of a given size to be stronger. On the other hand, the fact that the motor unit and any mechanical transmission associated therewith are combined in a single module which is fixed releasably in the shell-like structure makes the robot quicker to manufacture and assemble since the components of the motor and the transmission are preassembled to form the module which is then inserted quickly in the shell-like structure and fixed thereto. Naturally, this procedure also affords flexibility in production since different modules can be preassembled and fitted alternatively in the shell-like structure to produce different possible robot configurations. From the user's point of view, of course, the provision of an easily-replaceable module enables the robot to be repaired quickly and easily whenever one or more parts of the module are damaged. In fact, the entire module can be removed and replaced by another so that the robot can continue to work whilst the module which has been removed is repaired.

Finally, a further advantage of the invention lies in the fact that the shell-like structure is an ideal application for composite materials constituted by fibre-reinforced plastics which make the structure even lighter.

According to another preferred characteristic, the first body has an elongate shell-like structure which is open at one end so that it can receive the module and has means (manually or automatically operable) for connecting the electrical circuit of the module quickly to the electrical supply means in the shell-like structure.

The module preferably includes a cylindrical casing which houses the motor unit.

In the case of a robot with a plurality of elements and arms articulated to each other in series, the invention can be applied to each of the articulated elements. A particularly advantageous application is when the second body is the wrist of the robot and the first body is an arm of the robot which carries the wrist. In this case, according to the invention, the casing of the module houses the motor unit, a member driven by the motor unit, and the mechanical transmission between the motor unit and the driven member, the latter being supported rotatably in the casing of the module and having a portion which projects from a front end of the casing of the module and constitutes the load-bearing structure of the wrist so that the wrist and the module constitute a single unit which can be fitted in the shell-like structure of the robot arm.

In a preferred embodiment of the wrist of the robot according to the invention, the portion of the driven member which projects from the casing of the module in turn supports a further wrist portion for rotation about an axis perpendicular to the axis of rotation of the driven member, the latter also carrying a second motor unit for rotating the further wrist portion, and the further wrist portion in turn supports a third motor unit for driving a terminal member of the robot which is rotatable on the further wrist portion about an axis which is radial to the axis perpendicular to the axis of rotation of the driven member and which intersects those axes at the same point.

The wrist of the robot according to the invention thus has three motors which rotate the wrist about respective, distinct, mutually perpendicular axes. The advantage of the arrangement described above is that the operation of a single motor rotates the wrist solely about the axis controlled by that motor, without causing rotations about the other two axes which would have to be eliminated by the operation of the other motors. This advantage distinguishes the wrist of the robot according to the invention from those of the prior art, in which it is always necessary to activate more than one electric motor in order to rotate the wrist about a single axis.

A further problem which has to be confronted by the designers of articulated robots is the provision of guide means for the electrical supply cables of the electric motors for rotating the various arms. These cables must be guided through the mutual articulations of the various robot arms without the risk of the wires being twisted as a result of the rotations of the arms.

In order also effectively to resolve this problem, in one embodiment of the robot according to the invention, the first body constitutes a robot arm the ends of which are articulated to a support structure and to the second body respectively and at least two electrical cables extend through the arm to connect stationary electrical supply means to electrical equipment in the second body. In this case, the invention is also characterised in that the electrical cables are constituted by two resiliently-deformable helical cords arranged along two sides of the arm in a plane substantially perpendicular to the axes of articulation of the ends of the arm, each of the helical cords having one end portion fixed to the support structure on which the arm is rotatable and its opposite end portion fixed to the corresponding end of the arm so that any rotation of the arm relative to its support structure lengthens one of the two helical cords and shortens the other cord correspondingly.

A further particularly advantageous characteristic of the robot according to the invention is the way in which the robot is mounted on a fixed support structure constituted a quadrangular-sectioned beam. According to the invention, the robot has a pincer-like attachment with a central portion and two side portions articulated to the central portion, the central portion being connected to the robot structure and the side portions being movable between closed positions for grasping the support beam when the attachment is operative, and open release positions.

Preferably, the attachment also includes an auxiliary portion which can be fixed to the two side portions of the attachment when they are in their operative positions so as to define a structure which completely surrounds the support beam.

The attachment may also take the form of a slide slidable on the support beam which, in this case, is a guide beam. The central portion, the side portions and the auxiliary portion may have revolving means for engaging the guide beam.

A further subject of the present invention is a method of manufacturing an articulated robot which includes at least one first body and one second body supported by the first body for rotation about an axis, the first body including a load-bearing structure on which a motor unit for rotating the second body is mounted and a rigid outer casing, the method being characterised in that the rigid casing is formed by a shell-like structure so as also to perform the function of a load-bearing structure, the shell-like structure having an open end, in that a module including the motor unit is assembled separately, and in that, after its assembly, the module is inserted in the cavity in the shell-like structure and fixed thereto.

The advantages of this method of manufacture have already been discussed above.

BRIEF DESCRIPTION OF THE DRAWINGS

A preferred embodiment of the robot according to the invention will be described and illustrated with reference to the appended drawings, provided purely by way of non-limiting example, in which.

DETAILED DESCRIPTION OF THE INVENTION

Figure 1:
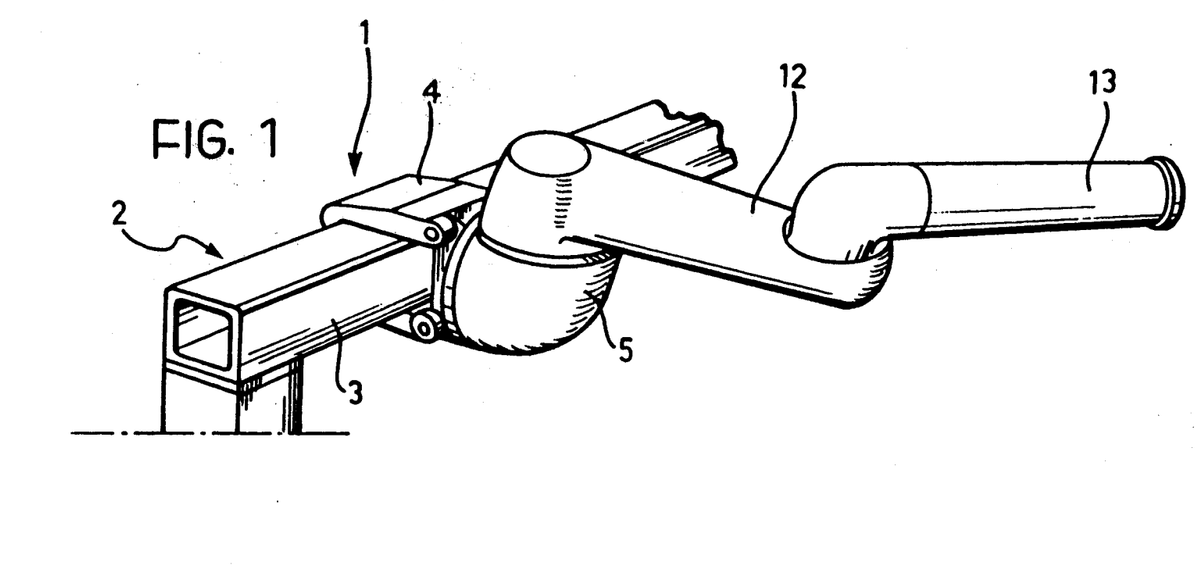
FIG. 1 is a perspective view of one embodiment of the robot according to the invention.

In FIG. 1 an articulated robot generally indicated 1, which can be used, for example, for handling objects, is carried by a structure 2 including a beam 3 which, in the embodiment illustrated, has a quadrangular-sectioned tubular configuration.

A slide 4, whose structure will be described in detail below, is mounted on the beam 3 and supports a first element 5 (FIG. 2) of the robot, by means of rolling bearings 7, for rotation about an axis 6. The first element 5 is rotated about the axis 6 by an electric motor 8, shown only schematically in FIG. 2, mounted in the hollow structure of the first element 5.

Figure 2:
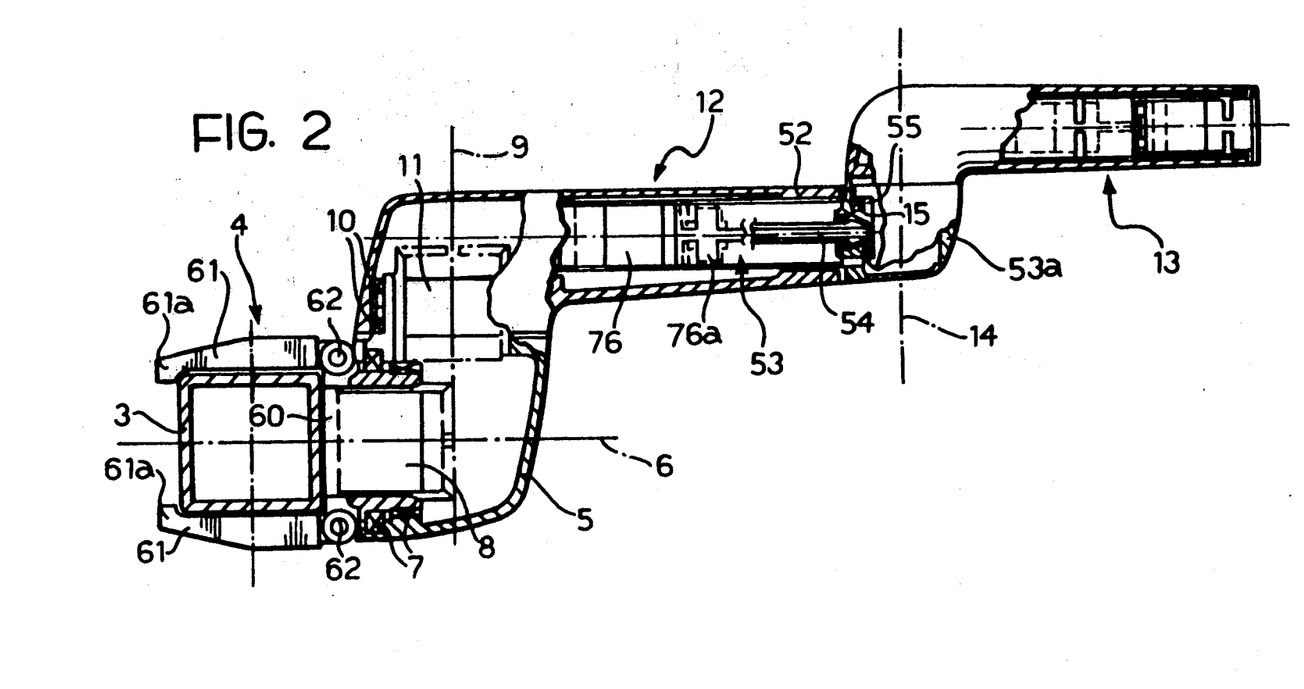
FIG. 2 is a partially-sectioned side view of the robot of FIG. 1, on an enlarged scale.

The robot element 5 supports a robot arm 12, by means of rolling bearings 10, for rotation about an axis 9 perpendicular to the axis 6. The arm 12 is rotated about the axis 9 by an electric motor 11 (shown only schematically) housed in the structure of the first element 5. The distal end of the arm 12 supports a forearm 13, by means of rolling bearings 15, for rotation about an axis 14 parallel to the axis 9. The forearm 13 is rotated about the axis 14, by means of a mechanical transmission which will be described below, by an electric motor 76, shown only schematically, mounted in the arm 12. The distal end of the forearm 13 carries a wrist 16 (FIG. 3) with three axes of rotation 17, 18 and 19.

Figure 3:
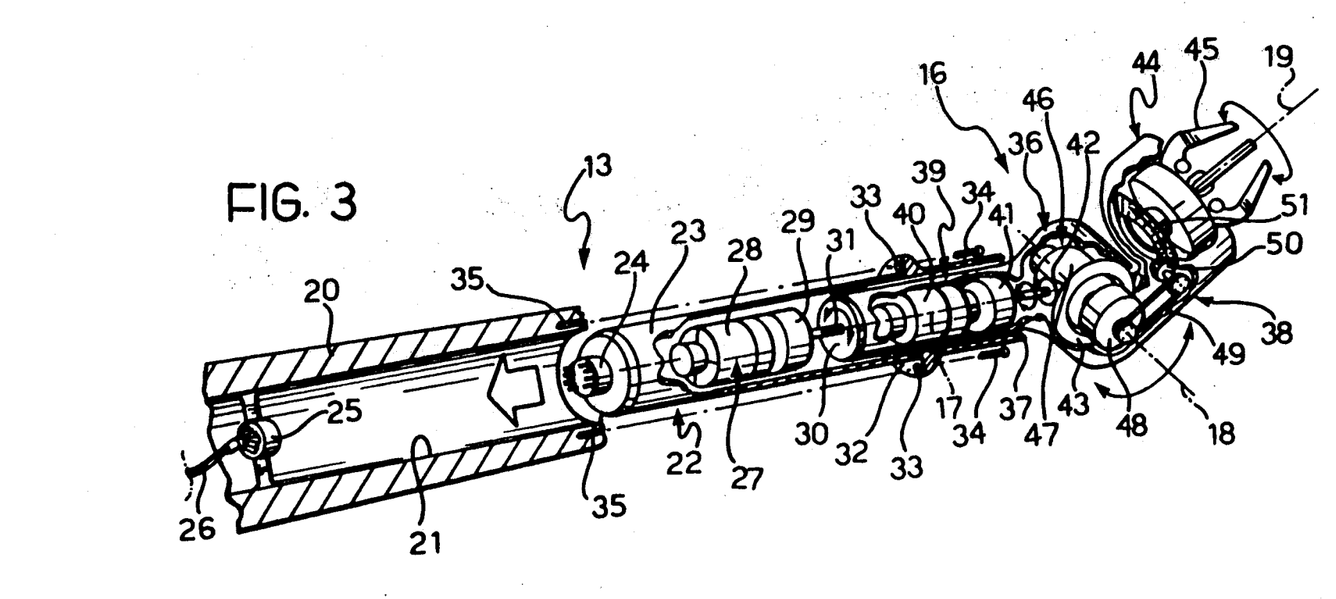
FIG. 3 is an exploded and sectioned perspective view of the end arm of the robot and the robot wrist associated therewith.

The structure and arrangement of the forearm 13 and the wrist 16 will now be described in detail with reference to FIGS. 3 and 4.

The load-bearing structure of the arm 13 is constituted by the casing 20 of the arm and this is in the form of a shell-like structure (of one or more rigidly-interconnected pieces) having an open end for enabling the insertion in the cavity 21 in the shell of a module 22 which includes a wrist 16 and the respective drive motors and which is partially assembled so that it can then be fitted into the shell 20 in a single operation. The module 22 includes a cylindrical casing 23 with an electrical connector 24 at one end for quick connection to a complementary connector 25 disposed in the cavity 21 in the shell-like structure 20 and connected to electrical cables 26 leading from electrical supply means. The connector 24 is connected by cables (not shown) to the various electric motors in the module 22. With reference to FIGS. 3 and 4, a first drive unit 27 is supported rigidly in the casing 23 of the module 22 and includes an electric motor 28 and an epicyclic reduction unit 29 which may be of any known type, for example, of the type marketed by the German company Harmonic Drive GmbH under the trademark "HARMONIC DRIVE". A member 30 which is driven by the drive unit 27 by means of a shaft 31 is also supported in the casing 23 for rotation about its axis 17. The casing 23 of the module 22 has an external annular flange 32 with axial holes 33 for the passage of screws 34 which engage threaded holes 35 in the annular end surface of the shell-like structure 20 so as to fix the module 22 to the shell-like structure. Naturally, any other type of fixing may be used. The cylindrical body of the driven member 30 has a portion 36 which projects from an open end 37 of the casing 23 and constitutes the load-bearing structure of the wrist 16. The portion 36 supports a further portion 38 of the wrist for rotation about the axis 19 which is perpendicular to the axis 17. The portion 38 is rotated about the axis 18 by a drive unit 39 fixed in the cylindrical body 30 and including an electric motor 40 and a reduction unit 41 similar to the reduction unit 29. The output shaft of the motor unit 39 rotates the portion 38 of the wrist by means of a pair of bevel gears 42, 43 connected for rotation with the output shaft and with the portion 38 of the wrist, respectively. The portion 38 is constituted by a hollow structure with a crank-like configuration having a distal end part 44 which supports a terminal element 45 (for example, a gripping member) for rotation about the axis 19 which is radial to the axis 18 and intersects the latter at its intersection with the axis 17. The terminal element 45 is rotated about the axis 19 by a drive unit 46 which, in the embodiment illustrated, is within the body 36 and is fast for rotation with the portion 38 of the wrist. Still with reference to the embodiment illustrated, the drive unit 46 comprises an electric motor 47 and a reduction unit 48 which drives the rotary member 45 by means of a toothed-belt transmission 49 and a pair of bevel gears 50, 51, the transmission 49 and the bevel gears 50, 51 being within the hollow structure of the portion 38 of the wrist.

Figure 4:
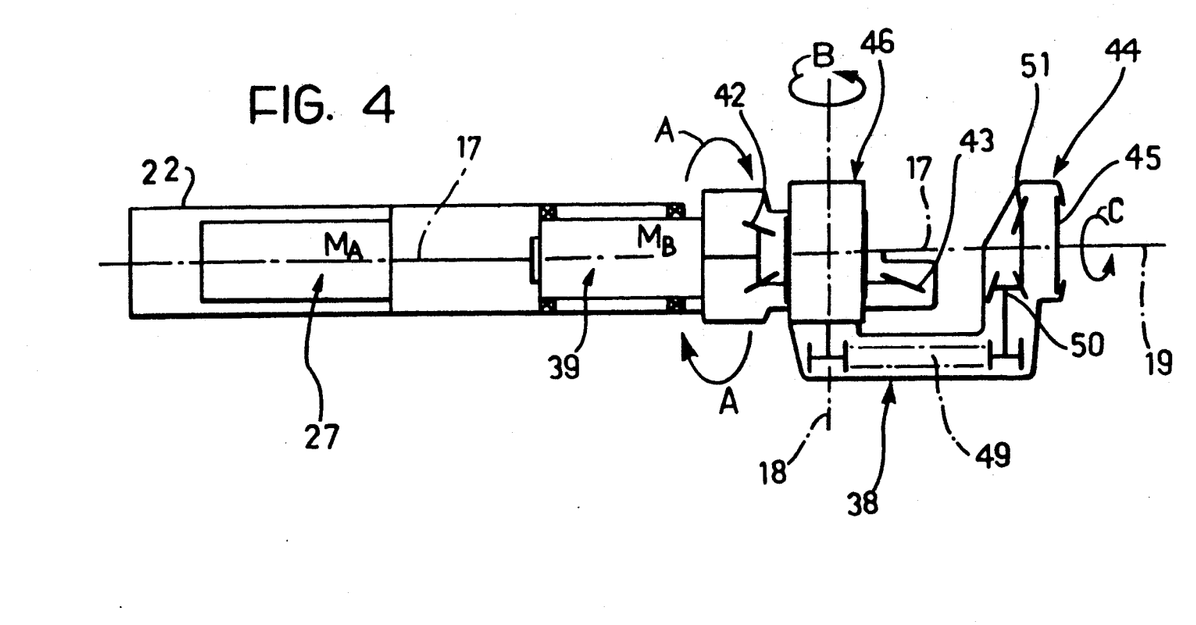
FIG. 4 is a schematic view of the unit shown in FIG. 3.

As is clear from the foregoing description, in the robot wrist according to the invention, the drive units 27, 39 and 46 rotate the terminal element 45 of the wrist about the axes 17, 18 and 19 respectively as shown by the arrows A, B and C respectively in FIG. 4. The operation of a single drive unit rotates the wrist solely about the corresponding axis without causing the undesired rotations about the other two axes which take place in known robot wrists in which, in order to rotate the wrist about one axis, it is necessary to operate one electric motor to cause the rotation and at least one further motor to eliminate the resulting undesired rotation about another axis.

A further advantage of the wrist arrangement described above is that the module 22 can readily be fitted telescopically in the shell-like structure 20 with a drive unit for moving the module 22 between a position in which it is retracted fully within the shell-like structure 20 and an extended position. Naturally, this further degree of freedom increases the working capacity of the robot. The linear movement of the module 22 along the axis 17 may be achieved in any known manner, for example, by a screw driven by a motor in the shell-like structure 20 and engaging a female thread carried by the module 22.

With reference again to FIG. 2, the structure of the arm 12 and of the element 5 of the robot is similar to that of the forearm 13 in the sense that each of these elements is in the form of a shell-like structure which performs a load-bearing function and houses a preassembled module including the respective motor unit. More particularly, the arm 12 includes a shell-like structure 52 having a load-bearing function and housing a module 53 including a cylindrical casing which in turn houses the electric motor 76 and its reduction unit 76a. The output shaft of the reduction unit rotates the forearm 13 about the axis 14 by means of a pair of bevel gears 54, 55. The shell-like structure of the forearm 13 is supported for rotation about the axis 14 by a portion 53a which forms part of the casing of the module 53 and constitutes an extension of the casing beyond the front end of the shell-like structure 52.

The shell-like structure of the element 5 houses a module carrying the electric motor 11, whilst the electric motor 8 is housed in the structure of the slide 4 (which will be detailed below).

The advantages of the configuration of the various parts of the robot described have already been explained fully above.

Figure 5:
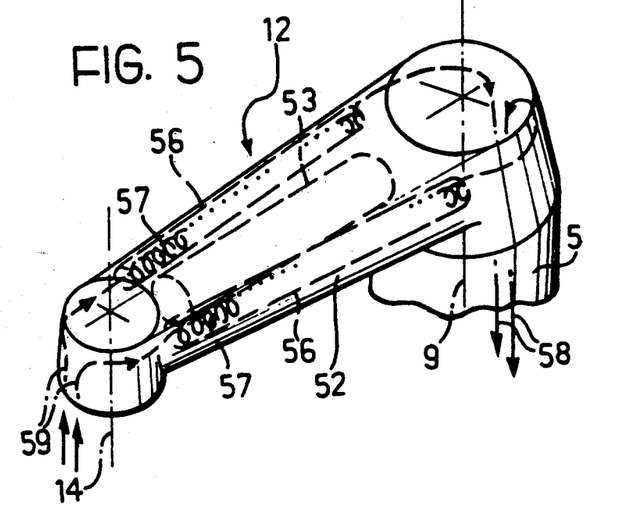
FIG. 5 is a perspective view of a detail of the robot according the invention.

With reference now to FIG. 5, this drawing is a schematic perspective view of the arm 12 of the robot, with its shell-like structure 52 shown in broken outline in order to show the parts inside that structure. As can be seen, along the two longitudinal sides of the arm 12 there are two tubular protective elements 56 housing two electrical cables 57 in the form of helical cords whose ends are connected respectively to cables 58 leading from the base structure of the robot at one end and to cables 59 leading to the electric motors on the forearm 13 at the other end. The arrangement of the cables 56 in the manner indicated is a particularly simple and effective solution to the problem of avoiding any twisting of the cables at the articulation 9 of the arm 12 to the element 5 of the robot. In FIG. 5, the module 53 housed in the arm 12 is also shown only schematically in broken outline. The two helical cords 57 are fixed at one end to the cables 58. Their opposite ends 59, however, are connected to the structure of the arm 12. The two helical cords 57 are in a plane which is normal to the axis 9 and to the axis 14.

Figure 6:
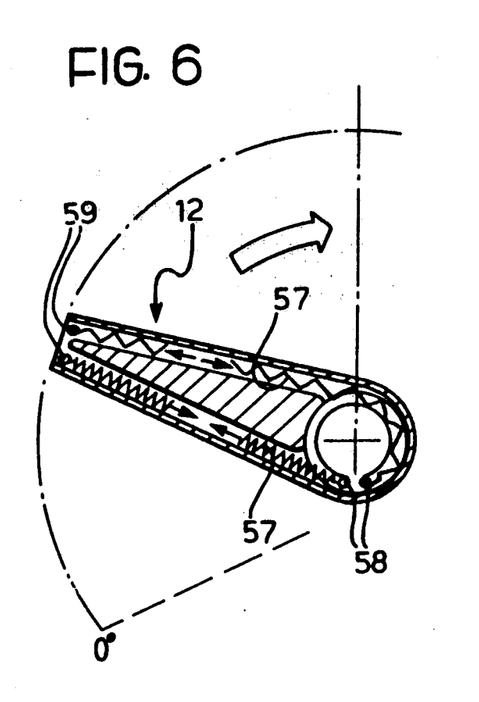
FIGS. 6, 7 and 8 are schematic views illustrating the operating principle of the structure shown in FIG. 5.
Figure 7:
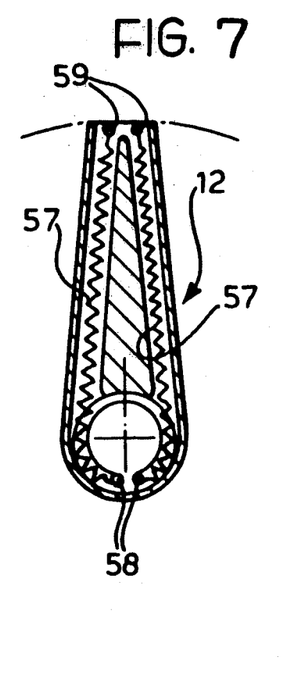
Figure 8:
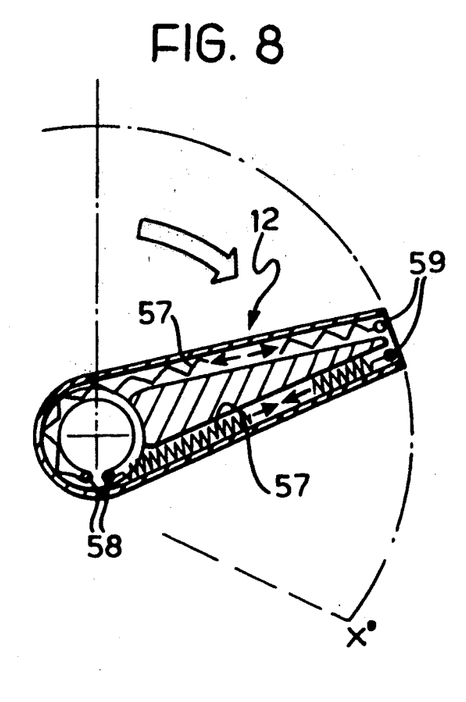

As a result of this arrangement, rotations of the arm 12 about the axis 9 lengthen or shorten each helical cord. FIGS. 6, 7 and 8 show this deformation schematically. FIG. 7 shows the arm 12 in an intermediate position in which the lengths of the two cords 57 are identical. FIGS. 6 and 8 show the arm pivoted to two positions on opposite sides of the intermediate position of FIG. 7 which correspond to the shortening of one of the two cords 57 and the lengthening of the other.

Figure 9:
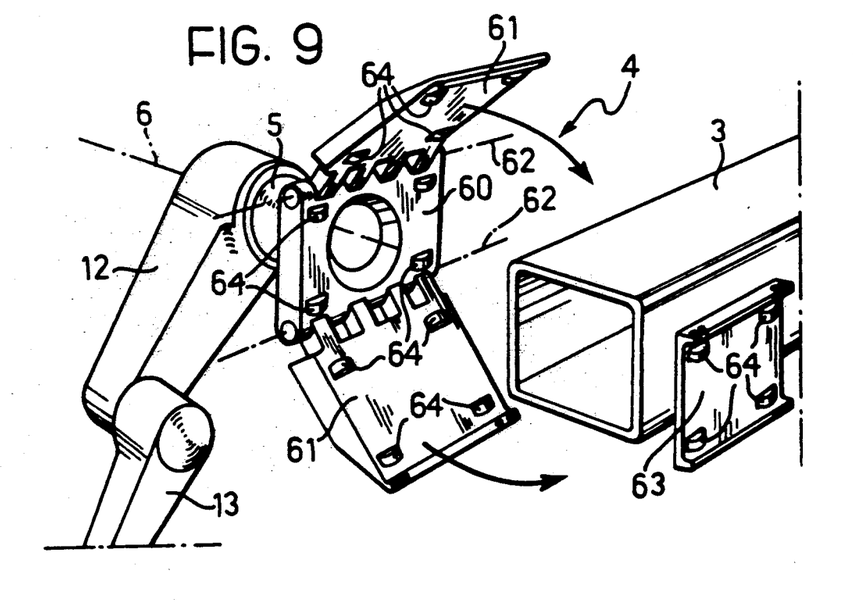
FIG. 9 is an exploded perspective view of a detail of the robot according to the invention.

FIG. 9 is an exploded view of the structure of the slide 4 which supports the robot and is guided on the beam 3. The slide 4 has a pincer-like body with a central portion 60 which supports the element 5 for rotation about the axis 6 and two side portions 61 articulated to the central portion 60 about two parallel axes 62. The side portions 61 are movable between open, inoperative positions (shown in FIG. 9) and closed, operative positions (FIG. 2) in which they engage two opposite sides of the guide beam 3. In the embodiment shown in FIG. 2, each of the two side portions 61 has a projecting end edge 61a which engages the side of the guide beam 3 opposite that which is engaged by the central portion 60 of the slide so as to restrain the slide on the beam. Alternatively (FIG. 9), an auxiliary portion 63 may be fixed to the end edges of the side portions 61 to form a closed structure which completely surrounds the guide beam. The central portion 60, the side portions 61 and the further portion 63, if present, have idle wheels 64 which engage the corresponding surfaces of the guide beam 3 to enable the slide 4 to move along the beam.

Obviously, a configuration identical to that described above may be used to form an attachment for fixed connection to a support beam such as the beam 3. In this case, of course, there are no guide wheels 64.

Naturally, the principle of the invention remaining the same, the details of construction and forms of embodiment may be varied widely with respect to those described and illustrated purely by way of example, without thereby departing from the scope of the present invention.

What is claimed is:

1. An articulated robot comprising an elongated arm having a shell-like structure with an open end defining an interior cavity and a module detachably secured in said cavity, said module being comprised of a cylindrical casing having a first axis and containing a motor, transmission means operatively connected to said motor and a driven wrist member operatively connected to said transmission means for rotation about said first axis, said driven wrist member having a projecting portion projecting outwardly of said casing of said module and said open end of said shell-like structure of said arm.

2. An articulated robot as set forth in claim 1, further comprising electrical connection means in said arm for making quick, detachable electrical connection between said module and said arm.

3. A robot according to claim 1, wherein said wrist member includes a further wrist portion supported by the projecting portion of the driven wrist member for rotation about a second axis perpendicular to said first axis, a second motor unit carried by the driven wrist member for rotating the further wrist portion, a third motor unit carried by the further wrist portion, and a terminal member of the robot which is rotatable on the further wrist portion, by means of the third motor unit, about a third axis which is radial to said second axis and which intersects said first and second axes at a common point.

4. A robot according to claim 1, including a support structure with electrical supply means and electrical equipment carried by the wrist member, said arm being articulated to the support structure and having at least two electrical cables extending through the arm to connect the electrical supply means to the electrical equipment in the wrist member, wherein the electrical cables are constituted by two resiliently extensible and contractible helical cords arranged along the two sides of the arm in a plane substantially perpendicular to the axes of articulation of the ends of the arm, each of the helical cords having one end portion fixed to the support structure on which the arm is rotatable and its opposite end portion fixed to the corresponding end of the arm so that any rotation of the arm relative to its support structure lengthens one of the two cords and shortens the other cord correspondingly.

5. A robot according to claim 1, wherein the arm is supported by an attachment member for mounting on a support beam, wherein the attachment member has a pincer-like body with a central portion and two side portions articulated to the central portion, the central portion being connected to the robot structure and the side portions being movable between closed positions for grasping a support beam when the attachment member is operative, and open release positions.

6. A robot according to claim 5, wherein the attachment member also includes an auxiliary portion which can be fixed to the two side portions of the attachment member when they are in their operative positions so as to define a closed structure which completely surrounds the support beam.

7. A robot according to claim 5, wherein the attachment member is slidable along the support beam (3).

8. A robot according to claim 7, wherein both the central portion and the side portions have revolving means for guiding the sliding of the attachment member on the support beam.

9. A method of manufacturing an articulated robot which includes at least one first body and one second body supported by the first body for rotation about an axis, the first body including a load-bearing structure, a motor unit carried by the load-bearing structure for rotating the second body, and a rigid outer casing, wherein it includes the steps of forming the rigid casing as a shell-like structure which defines a cavity and also has a load-bearing function, assembling a separate module including the motor unit, and inserting the assembled module in the cavity in the shell-like structure and fixing it thereto.

* * * * *

UNITED STATES PATENT AND TRADEMARK OFFICE
CERTIFICATE OF CORRECTION

PATENT NO. : 5,195,388

DATED : March 23, 1993

INVENTOR(S) : Mauro ZONA and Marco BETTINARDI

It is certified that error appears in the above-identified patent and that said Letters Patent is hereby corrected as shown below:

ON THE TITLE PAGE:

-- [75] Inventors: Mauro Zona; Marco Bettinardi, both of Turin, Italy --

Signed and Sealed this

Twenty-ninth Day of March, 1994

Attest:

BRUCE LEHMAN

*Attesting Officer*     *Commissioner of Patents and Trademarks*